United States Patent Office 3,499,887
Patented Mar. 10, 1970

3,499,887
POLYMERIZATION CATALYSTS FOR
EPISULPHIDES
Wilfrid Cooper, Aldridge, George Vaughan, Sutton Coldfield, and Reginald T. Wragg, Tamworth, England, assignors to The Dunlop Company Limited, London, England, a British company
No Drawing. Filed Apr. 28, 1967, Ser. No. 634,476
Claims priority, application Great Britain, May 13, 1966, 21,239/66
Int. Cl. C07d 23/00; C07f 3/06, 3/08
U.S. Cl. 260—239        4 Claims

ABSTRACT OF THE DISCLOSURE

Organometallic compounds suitable as catalyst for the polymerization of episulphides, in which at least one of the valency states of the metal is satisfied by the grouping —SR where R represents an organic radical containing at least one other atom which is chemically bonded to the metal or which is associated with the metal by means of a co-ordination bond, are prepared by reacting a salt of the metal with the appropriate thiol compound.

---

This invention relates to the polymerization of episulphides.

The present invention provides organometallic compounds suitable as catalysts for the polymerization of episulphides, in which one or more of the valency states of the metal are satisfied by the grouping —SR where R represents an organic radical containing at least one other atom which is chemically bonded to the metal or which is associated with the metal by means of a co-ordination bond. (Hereafter these compounds will be referred to as "catalysts.")

The present invention also provides a method for the polymerization of one or more episulphides which comprises contacting the episulphide or episulphides with these organometallic polymerization catalysts.

Particularly suitable catalysts are compounds in which the metal has a co-ordination number of 4, 5 or 6 in complexes with ligands containing sulphur and/or other donor atoms. Examples of such metals are zinc, cadmium, copper, silver and nickel but certain other metals, e.g. lead can also be employed. The particularly preferred catalysts are those which contain zinc or cadmium as the metal. Not all the valency states of the metal need be satisfied by the chemical bonds to the —SR grouping as described above. The catalysts have the general structure $Z_A$—M—(S—R)$_B$ where M is the metal, Z is an anion such as Cl⁻, CH₃COO⁻ or CO₃⁻⁻ and A is equal to 0, 1, 2 ... $(Az+By-y)$, $(Az+By)$, where z is the valence of the anion and y is the number of atoms or groups in the —S—R grouping which are chemically bonded to the metal M. The group R of the polymerization catalyst can be an aliphatic cycloaliphatic, heterocyclic, aryl or aralkyl radical but must contain a second atom or grouping which is either bonded or co-ordinated to the metal atom M. In the case where R contains an atom or grouping, Y, such as S or COO, which is chemically bonded to the metal M, such compounds can be represented by the general formula

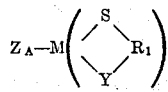

in which A is equal to 0, 1, 2 ... $(Az+2B-2)$, $Az+2B$ where B is an integer greater than 0 and is usually equal to 1, and R₁Y is equivalent to R. Examples of suitable catalysts of this formula are the compounds obtained from a divalent metal such as zinc, cadmium and copper with ethane dithiol (i.e. R₁ is a di-methylene group and Y is sulphur) or bis (beta-mercaptopropyl) sulphide (i.e. R₁ is —CH₂CH(CH₃) SCH(CH₃) CH₂— and Y is sulphur). In the case where R contains an atom which is associated with the metal as by means of a co-ordination bond (→), the compounds can be represented by the general formula

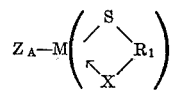

where A is equal to 0, 1, 2 ... $(Az+B-1)$, $Az+B$ where B is an integer greater than 0, X represents a group containing an atom such as nitrogen, oxygen, sulphur or phosphorus capable of forming a co-ordination bond with the metal and R₁X is equivalent to R. Particularly suitable catalysts of this type are compounds in which A is 0 and B is 2 and M is a divalent metal i.e. compounds of general formula

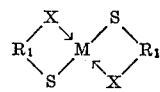

The group X in the above general formula may be for example an —OR₂ group, an —SR₃, an —N(R₄R₅) group or a P(R₆R₇) wherein said groups R₂, R₃, R₄, R₅, R₆ and R₇ represent hydrogen atoms, alkyl groups, cyclo-aliphatic groups, aryl or aralkyl groups. The simplest compounds of this type are those in which X represents a hydroxyl group or an amino group. These simple compounds are generally insoluble in the episulphide monomer or monomers to be polymerized and in most common solvents. However, by substituting alkyl or other hydro-carbon groupings onto the nitrogen, sulphur or other co-ordinating atom, the compounds can be made soluble in the monomer or monomers to be polymerized or in the solvent and these soluble catalysts are particularly useful in that they enable control to be exercised over the molecular weight of the resulting polymers. Particularly preferred, are compounds in which X is —NR₄R₅ where one or both of R₄ and R₅ are the same or different alkyl groups having 1 to 4 carbon atoms.

Examples of suitable catalysts of this type are the complexes obtained from a metal salt and, for example, beta-aminoethane thiol, (gem-dimethyl) beta-aminoethane thiol (i.e. R₁ is —CH₂·C(CH₃)₂—) or beta-mercapto ethanol ethanol (i.e. R₁ is —CH₂CH₂—) N-n-butylaminopropane-2-thiol or N-di-n-butyl aminopropane-2-thiol (i.e. R₁ is —CH₂CH(CH₃)—). The last two named compounds are catalysts which are soluble in the monomer(s) or in hydrocarbon solvents.

For convenience most of the structural formula are depicted in the monomeric form in which the group X or Y is linked to the same metal atom as the sulphur. Analytical and molecular weight data generally support these structures. It is possible, however, for more than one metal atom to be attached in the complex and thus result in dimeric and higher polymeric structures such as

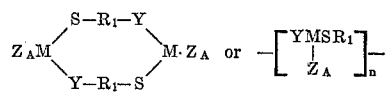

The polymerization catalysts can be prepared by reacting a salt of the metal such as the oxide, chloride or acetate of the metal with the appropriate thiol compound preferably in the presence of an acid-acceptor. The thiol compound must contain in addition to the thiol group a further atom which can become bonded directly or by means of a co-ordination bond to the metal. This further atom can be for instance a sulphur atom in the form of a second thiol group to yield catalysts of formula

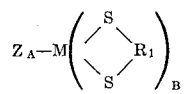

As described hereinbefore they may also be dimeric or polymeric in structure. In the case where the catalyst contains an atom which co-ordinates with the metal rather than becomes directly bonded then the metal salt is reacted with for example an amine-thiol $$[(R_4R_5)N-R_1-SH]$$

or an ether thiol ($R_2O-R_1-SH$). Usually in this case two moles of the amine-thiol or ether-thiol will react with one mole of the salt of a divalent metal.

The reaction between the metal salts and the thiol compounds to prepare the catalysts can conveniently be carried out at room temperature (10 to 30° C.) simply by mixing the reagents in the presence of an acid acceptor such as sodium hydroxide, sodium bicarbonate, or ammonia, and stirring the mixture. The catalysts are stable and can be stored for several weeks prior to use. The amount of the metal salt and the thiol compound used can vary considerably but the molar ratio of the metal salt to the thiol will preferably be from 1:1.5 to 1:2.5, usually 1:2 especially with zinc and cadmium salts.

The polymerization of one or more episulphides using the catalysts can be carried out in the bulk phase or if desired in the presence of an organic solvent for the episulphide or episulphides to be polymerized. Examples of suitable solvents are the liquid hydrocarbons, such as hexane and benzene, certain halogenated solvents such as halogenated hydrocarbons, e.g. chloroform, and a large excess of the solvent may be used. Alternatively the polymerization can be effected by an emulsion or suspension polymerization technique in which the reaction is carried out in the presence of a non-solvent for the episulphide or episulphides such as water, which may preferably contain an emulsifying agent or a dispersing agent (e.g. polyvinyl alcohol).

The polymerization reaction can be carried out at a temperature of from −50° C. to 150° C. Room temperature (10 to 30° C.) can be employed for convenience. The reaction begins immediately upon contact of the monomer or monomers with the catalyst and depending upon the particular catalyst may take from 1 hour to 30 hours to reach completion. Substantially complete conversion of monomer to polymer is obtained.

The shape of the conversion time curve depends upon the metal and the particular thiol chosen for the formation of the catalyst complex. Other things being equal cadmium complexes generally give shorter induction periods than zinc compounds. The induction period may also be reduced by use of a catalyst which does not form the more stable 5 or 6 membered rings in the initial complex since in the latter the insertion of the first monomer unit usually occurs at a slower rate than the subsequent propagation steps. Rapid initiation is obtained from the cadmium mercaptide of 1',2-dimethyl-2'-diethylamino-2-mercapto-diethyl-sulphide $$(Et_2N \cdot CH_2CH(CH_3) \cdot S \cdot CH_2CH(CH_3)SH)$$

which forms an eight membered ring in the initial complex.

The molecular weight of the resulting polymers may vary over a wide range and is controlled by the amount and solubility characteristics of the catalyst. As hereinbefore stated the use of soluble catalysts enables a greater degree of control to be exercised over the molecular weight of the resulting polymer.

The amount used of the catalyst is dependent upon the desired molecular weight of the polymer to be produced, being greater the lower the desired molecular weight of the polymer. The presence of certain impurities, especially mercaptans, in the reaction mixture is detrimental to the control of molecular weight by catalyst concentration and when high molecular weight polymers are required they should be rigidly excluded.

Mercaptans or compounds which can react with the episulphide to yield mercaptans, such as for example amines, can be used as transfer agents. Added in controlled amounts they result in a lowering of the molecular weight of the polymer without any change in rate of polymerization. The amount to be added to produce a given molecular weight will of course depend upon the nature of the mercaptan used and on the amount of catalyst used.

It is believed that the polymerization catalyst is incorporated into the growing polymer chain and provides the active centre at which growth of the polymer chain occurs. Growth of the polymer chains continues until all the available monomer has been polymerized and the resulting polymer chains contain the active centre provided by the catalyst incorporated therein. This active centre is stable and even after a period of several weeks addition of a further amount of monomer to the polymerization reaction mixture will result in polymer-chain growth to increase the length of the existing polymer chains. The present invention therefore provides a method of making block copolymers of episulphides since the monomer added to an existing polymer containing an active centre may be a different monomer to that initially added to the catalyst.

The polymerization reaction is difficult to terminate and it has been found that polymer chain growth can continue even after the addition to the polymerization reaction mixture of a mixture of acid and alcohol. Thus the polymerization activity is usually terminated only on removal of the catalyst from the polymer chains. This removal of catalytic activity from the polymer can be effected by adding a low molecular weight thiol compound to the polymerization reaction mixture. When all the monomer has been converted to polymer, the metal will be removed from the polymer and precipitated as an insoluble compound with the thiol compound which can be removed by filtration if necessary.

As stated hereinbefore, particularly suitable catalysts are those containing two (—S—R) groupings attached to the same metal atom particularly a divalent metal and in which the R grouping also contains a co-ordinating group X i.e. catalysts of the general monomeric form.

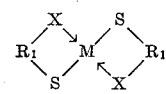

Such catalysts result in growth of two polymer chains simultaneously, and removal of the metal from the polymer results in polymers of molecular weight approximately one half of the molecular weight of the growing polymers. Also, removal of the metal will result in the production of a terminal thiol group on each of the polymer molecules.

Also of particular importance in producing polymers of mercaptan functionality of two or more are those catalysts which are formed in such a way that they contain two or more sulphur atoms attached to the same metal atom and to the same R grouping i.e. catalysts of the structure

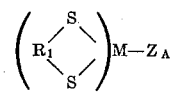

in their simplest form particularly those from the divalent zinc or cadmium

and those where several sulphur atoms are attached to the same $R_1$ grouping but perhaps to different metal atoms i.e. catalysts of the general form

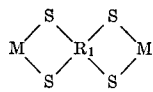

in their simplest form. In these catalysts the grouping $R_1$, may also contain an atom which co-ordinates to the metal M but these bonds are not depicted in the formula.

The polymerization process of the present invention can be used to effect the polymerization of a wide variety of episulphides. Aliphatic, cycloaliphatic or aromatic episulphides can be polymerized, as can mono-episulphides and episulphides containing more than one episulphide group. Examples of suitable episulphides are aliphatic and cycloaliphatic mono- and diepisulphides such as ethylene sulphide, propylene sulphide, pentene episulphides, hexadiene mono- and diepisulphides, cyclohexene episulphide, cyclopentadiene diepisulphide and decatriene triepisulphides. Aromatic episulphides such as styrene episulphide may be polymerized. The episulphides may if desired contain substituents attached to the carbon atoms of the molecular chain.

Those polymers having a mercaptan functionality of two or more can be cured by heating with a curing agent such as lead oxide in the presence of a small amount of a trifunctional thiol compound or by treating with other reagents which are reactable with two or more of the mercaptan groups such as activated dienes e.g. divinyl sulphone, diisocyanates e.g. toluene diisocyanate and diepoxides.

The polymers can be used for coatings, adhesives and, laminates and in applications where oil resistance is important.

The invention is illustrated by the following examples. In the examples, the hydrated zinc acetate has the formula, $Zn(OAc)_2 \cdot 2.5H_2O$.

EXAMPLE I

This example illustrated the preparation of catalysts containing zinc as the metal.

42.0 gms. of N-dibutylaminopropane-2-thiol were added to a solution of 10 gms. of sodium hydroxide in 200 mls. of water. Sufficient ethanol was then added to cause complete dissolution of the amine-thiol. A solution of 130 gms. of zinc chloride in 40 mls. of water was slowly added to the mixture which was vigorously stirred throughout the addition. Stirring was continued after the addition of the zinc chloride and after 1 hour at room temperature the resulting mixture containing a viscous oil was extracted several times with ether. The ether solution was dried over magnesium sulphate and was then concentrated by evaporation. The resulting viscous residue was then dried under vacuo (0.01 mm. Hg) at 70–80° C. for 3 hours. This preparation was denoted as Experiment No. 1.

The residue was then analysed, and the analysis corresponded to a formula of:

$$[(C_4H_9)_2 \cdot N \cdot CH_2 \cdot CH(CH_3) \cdot S]_2Zn$$

or $$[(C_4H_9)_2 \cdot N \cdot CH(CH_3) \cdot CH_2 \cdot S]_2Zn$$

The molecular weight of the complex and its infrared spectrum are in agreement with the above structural formulae. The complex was obtained in quantitive yield.

In a further experiment (Experiment No. 2) using the above reagents in the same quantities, the powdered zinc chloride and the amine-thiol were mixed together for 30 minutes, and the other reagents were then added. After a further 30 minutes the product was neutralized with sodium bicarbonate, extracted with ether and isolated as described above. The product was the same as described above and it was again obtained in quantitative yield.

The procedure of Experiment No. 1 was again repeated (Experiment No. 3) except that the N-dibutylaminopropane-2-thiol was replaced by an equimolar amount of N-monobutyl-aminopropane-2-thiol. The product could be crystallized as needles from chloroform. This product was analysed the analysis corresponding to the formula:

$$[C_4H_9 \cdot NH \cdot CH_2 \cdot CH(CH_3) \cdot S]_2Zn$$

or $$[C_4H_9 \cdot NH \cdot CH(CH_3) \cdot CH_2 \cdot S]_2Zn$$

EXAMPLE II

This example illustrates the preparation of catalysts containing cadmium as the metal.

The procedure outlined in Experiment No. 2 of Example I was employed to react N-monobutylaminopropane-2-thiol with cadmium acetate. The reagents were used in the amounts given in Example I. The product was a solid which was soluble in hydrocarbons. The solid was not readily crystallised. Analysis of the product indicated the formula:

$$[C_4H_9 \cdot NH \cdot CH_2 \cdot CH(CH_3) \cdot S]_2Cd$$

or $$[C_4H_9 \cdot NH \cdot CH(CH_3) \cdot CH_2S]_2Cd$$

The above procedure was again repeated, but using N-dibutylaminopropane-2-thiol instead of the monobutyl derivative. The product was a viscous oil, the analysis of which indicated the formula $$[(C_4H_9)_2 \cdot N \cdot CH_2 \cdot CH(CH_3) \cdot S]_2Cd$$

or $$[(C_4H_9)_2 \cdot N \cdot CH(CH_3) \cdot CH_2S]_2Cd$$

EXAMPLE III

This example illustrates the preparation of further catalysts containing zinc as the metal.

A complex of beta-aminoethane thiol and zinc was prepared by the procedure outlined in Experiment No. 1 of Example I, using beta-aminoethane thiol instead of the dibutylaminopropane-2-thiol.

The product was a quantitative yield of a crystalline solid, analysis of which indicated the formula:

$$(H_2N \cdot CH_2 \cdot CH_2 \cdot S)_2Zn$$

The procedure of Experiment No. 1 of Example I was again repeated but this time using (gem-dimethyl) beta-aminoethane thiol as the thiol compound. The product was a crystalline solid obtained in quantitative yield of formula:

$$[H_2N \cdot C(CH_3)_2 \cdot CH_2 \cdot S]_2Zn$$

or $$[H_2N \cdot CH_2 \cdot C(CH_3)_2 \cdot S]_2Zn$$

EXAMPLE IV

This example illustrates the preparation of a catalyst containing an oxygen atom.

The procedure of Experiment No. 1 of Example I was used to react beta-hydroxyethane thiol (beta-mercaptoethanol) and zinc chloride. The product was obtained in quantitative yield and was a viscous oil which slowly set to a brittle mass. Analysis of the product indicated the formula:

$$(HO \cdot CH_2 \cdot CH_2 \cdot S)_2Zn$$

EXAMPLE V

This example illustrates the preparation of catalysts from dithiols.

Ethane dithiol and zinc chloride were reacted together by the procedure of Experiment No. 1 of Example I to yield a product of formula:

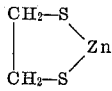

By the same procedure bis(beta-mercaptoisopropyl) sulphide and zinc chloride were reacted together to yield a product of formula:

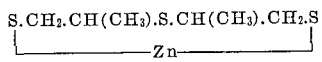

S.CH₂.CH(CH₃).S.CH(CH₃).CH₂S
|_____Zn_____|

EXAMPLE VI

Each of the products from Examples I to V was used to polymerize propylene sulphide by the following procedure. 2 percent by weight based on the propylene sulphide of the catalyst was added to propylene sulphide in a bottle which was then sealed. The bottle was tumbled end over end for 24 hours at room temperature, after which time the percentage conversion of monomer to polymer was determined approximately.

In all cases except where the catalyst prepared from (gem-dimethyl)-beta aminoethane thiol was used the percentage conversion of monomer to polymer was greater than 75 percent. In the exception it is believed that polymerization was slow due to steric hindrance effects.

The catalysts from Examples I and II were soluble in the propylene sulphide.

EXAMPLE VII

This example demonstrates the control of molecular weight which can be achieved by varying the concentration of catalyst and/or the conditions of polymerization, the catalyst in this case being cadmium bis (N-dibutylamino-propane-2-mercaptide) prepared as in Example II unless otherwise stated.

The molecular weights obtained depend on the purity of the monomer and the catalyst as well as on the concentration of catalyst. Thus traces of mercaptan in the monomer or secondary amine in the catalyst will reduce the molecular weight, the former by transferring growing chains from the metal complex and the latter after conversion into a mercaptan by reaction with the monomer. In attempts to prepare polymer of molecular weight=2.4×10⁶ as in Experiment No. 11 or 12, it is clear that typical impurities such as allyl mercaptan or dibutylamine in amounts of the order of 30 p.p.m. will halve the attained molecular weight. The tabulated data show that with this catalyst the molecular weight can be controlled from below 2000 to about 400,000. The advantageous step of purifying monomer and catalyst is demonstrated particularly by the data in Experiments 9, 10 and 12 compared with Experiments 8 and 11 with less pure monomer, and this shows that although theoretical values have not been obtained molecular weight control is adequate for all practical purposes.

| Experiment | Catalyst, moles/mole monomer | Monomer purity (a), percent | η (CHCl₃) | MW (b) Obsed | Calculated ver(c) |
|---|---|---|---|---|---|
| 1 | 9×10⁻² | >99.5 | | 1,340(d) | 1,350 |
| 2 | 4.5×10⁻² | >99.5 | | 3,900(d) | 2,200 |
| 3 | 9×10⁻³ | >99.5 | 0.17 | 11,000 | 8,800 |
| 4 | 1.8×10⁻³ | >99.5 | 0.60 | 46,000 | 42,000 |
| 5 | 7.5×10⁻⁴ | ca 97 | 0.50 | 38,000 | 100,000 |
| 6 | 4.8×10⁻⁴ | ca 97 | 0.54 | 40,000 | 150,000 |
| 7 | 3.7×10⁻⁴ | ca 97 | 0.72 | 56,000 | 200,000 |
| 8 | 6.0×10⁻⁵ | ca 97 | 0.83 | 66,000 | 1,200,000 |
| 9 | 5.0×10⁻⁵ | >99.5 | 1.8 | 60,000 | 1,500,000 |
| 10 | 5.95×10⁻⁵(e) | >99.5 | 3.6 | 380,000 | 1,200,000 |
| 11 | 3.0×10⁻⁵ | ca 97 | 0.88 | 71,000 | 2,400,000 |
| 12 | 3.0×10⁻⁵(e) | >99.5 | 4.20 | 420,000 | 2,400,000 |

(a) From gas phase chromatographic examination. Monomer treated with a 2% solution of litharge in 10% NaOH to remove mercaptan impurities.

(b) Obtained from the intrinsic viscosity in CHCl₃ related to molecular weight by $\eta = 0.6 \times 10^{-4} M^{0.86}$ (units, dl./g.).

(c) Molecular weights, measured and calculated refer to double molecules since the catalyst is a bifunctional initiator and remains in the polymer (Cd (S polymer NBu₂)₂).

(d) Ebullioscopic molecular weight.

(e) Specially purified catalyst, details as follows:

To a solution of 0.12 mole of cadmium acetate dihydrate in methanol was added 0.2 mole of N-dibutylaminopropane-2-thiol. After standing for 5 hours, 5 ml. of ammonia (density=0.880) was added with shaking. After 16 hours an excess of ammonia was added dropwise with vigorous stirring and the mixture was then poured into an excess of water. The viscous oil was dissolved in benzene and this solution was passed several times through a short column packed with molecular sieve (Union Carbide 4A). The remaining benzene was then removed by freeze-drying to leave a highly viscous oil, which was the cadmium mercaptide of N-dibutylaminopropane-2-thiol. M.wt. (calc.) 516 M.wt. (found) 518 (Analysis.—Found (percent): C, 49.9; H, 9.2; N, 4.9; S, 12.9; Cd, 22.3. Calc. (percent): C, 51.1; H, 7.4; N, 5.4; S, 12.4; Cd, 21.7).

For storage, the catalyst was made up as a standard solution in benzene (2.74 g./100 ml.).

Catalyst solution was added to purified propylene sulphide monomer and the mixture was allowed to react for 72 hours at 30° C. when polymerization was essentially complete.

EXAMPLE VIII

This example describes the preparation of silver, copper, lead and nickel complexes of N-dibutylaminopropane-2-thiol together with their use as catalysts for the preparation of polypropylene sulphide.

(a) Silver complex of N-dibutylaminopropane-2-thiol

To a solution of silver nitrate (8.5 gm.) in water (50 ml.) was added 0.880 ammonia (10 ml.) followed by the amino thiol (10.0 gm.). After shaking the mixture for 1 hour, the precipitate was filtered off, washed with water and methanol and dried in vacuo. Crystallisation from petroleum spirit (B.P. 60–80°) afforded small yellow needles M.P. 97–98°.

Found (percent): C, 42.9; H, 7.8; N, 4.2; Ag, 34.8. Calc. (percent): C, 42.6; H, 7.7; N, 4.5; Ag, 34.8.

(b) Copper and lead complexes of N-dibutylaminopropane-2-thiol

These are prepared by the reaction of cupric and lead acetates with the amino thiol, as previously described. They are viscous oils which can be isolated by extraction with ether.

The copper complex is the cupric derivative as shown by the molecular weight and analytical data. M.wt. (Found 461). M.wt. (Calc. 467).

(c) Nickel complex of N-dibutylaminopropane-2-thiol

This is a dark brown viscous oil prepared by reacting an aqueous solution of Ni^II acetate and N-dibutylaminopropane-2-thiol.

Found (percent): C, 58.6; H, 10.8; N, 5.8; Ni, 12.9. Calc. (percent); C, 57.1; H, 10.4; N, 6.1; Ni, 12.7. M.wt.: Found 477, Calc. 463.

These complexes are believed to have the general structure shown below:

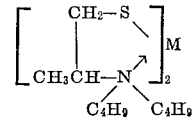

$$\left[ \begin{array}{c} CH_2-S \\ | \\ CH_3CH-N \end{array} \right]_2 M$$
$$\quad\quad\quad\quad C_4H_9 \quad C_4H_9$$

where M=Ag, Cu, Pb or Ni.

The various metal complexes were compared for catalytic efficiency in the polymerization of propylene sulphide and also with the zinc and cadmium complexes of the same thiol, prepared as in Examples I and II. The polymerizations were effected at 23° C. using 0.02 mole of catalyst/mole monomer.

| Complex | Time, hrs. | Polymer Yield, percent | Yield, percent hr. |
| --- | --- | --- | --- |
| M—Cd | 1 | 90 | 90 |
| Zn | 3 | 80 | 27 |
| Cu | 48 | 95 | 2 |
| Ag | 48 | 80 | 1.6 |
| Ni | 60 | 60 | 1 |
| Pb | 60 | 53 | 0.9 |

These results show the greater reactivity of zinc and cadmium compounds compared with the other metal complexes.

EXAMPLE IX

This example illustrates the polymerization of ethylene sulphide by the zinc and cadmium complexes of dibutyl-aminopropane-2-thiol prepared as in Examples I and II. The polymerizations were conducted at 20° C. in the absence of solvent. The catalyst dissolved immediately in the monomer.

| Catalyst | Catalyst concentration, mole/mole monomer ×10⁴ | Polymer yield percent | | | |
| --- | --- | --- | --- | --- | --- |
| | | 10 hr. | 20 hr. | 30 hr. | 40 hr. |
| Zinc | 6 | 9 | 23 | 51 | 78 |
| | 12 | 20 | 52 | 77 | 92 |
| Cadmium | 6 | 34 | 65 | 85 | 93 |
| | 12 | 75 | 93 | 100 | |

In the case of the zinc complex there is an acceleration in the rate as polymerization proceeds up to about 60% conversion after which there is a decline in rate as monomer is consumed. This is due to the reaction of the soluble complex with ethylene sulphide being slower than the subsequent rate of addition of monomer to the growing polymer chain. The exact behaviour of the catalyst depends on the nature of the complex and the metal and in some cases the maximum rate is observed immediately and thereafter there is a steady fall in rate as the reaction proceeds. The induction periods with cadmium catalysts are generally very small.

EXAMPLE X

This example describes the preparation of cadmium bis [1-methyl-2-(1'-methyl-2'-diethylamino ethyl thio)-mercaptide],

and its use as a catalyst for the polymerization of propylene sulphide.

To a stirred solution of cadmium acetate dihydrate (6.6 gm.) in boiling methanol (100 ml.) was added the amino thiol (11.0 gm., 0.05 mole) (1',2-dimethyl-2'-diethyl-amino-2-mercapto-diethyl sulphide). After 1 hour the solution was cooled and filtered from a small amount of solid. The filtrate was concentrated in vacuo to afford a viscous oil which, on trituration with ether, yielded the white amorphous cadmium mercaptide. This compound is an excellent catalyst for episulphide polymerization and maximum polymerization rate is attained immediately indicating that the insertion of the first monomer unit into the complex occurs at least as fast as the addition of subsequent units. This behaviour is to be contrasted with Example IX where a slow starting reaction was observed in one instance. By choice of initiator structure induction periods are completely eliminated.

EXAMPLE XI

This example illustrates the preparation of catalysts from a polyfunctional trithiol. In addition to the specified

structure the R grouping has a free thiol group which may be useful for conducting further reactions in the polymer produced, or which may be involved in transfer reactions during the polymerization.

(a) Cadmium mercaptide of 1,2,3 propane trithiol

To cadmium acetate dihydrate (7.6 gm.) in boiling methanol (100 ml.) was added the trithiol (2.8 gm.). After 2 hours the precipitate was filtered off, washed thoroughly with methanol and dried in vacuo. The product was insoluble in common solvents and in propylene sulphide.

Analysis.—Found (percent): C, 14.5; H, 2.4; Cd, 46.3; S, 36.8.

The analysis corresponds to an empirical formula $C_3H_6CdS_3$ and an argentimetric titration reveals the presence of one —SH group per cadmium atom. Several structures are possible but

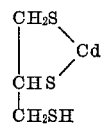

is probably its simplest monomeric form.

(b) Zinc mercaptide of propane 1,2,3 trithiol

This was prepared in the same way as the cadmium analogue replacing the cadmium acetate with hydrated zinc acetate. The analysis corresponded exactly to the formula suggested in the preceding experiment except that zinc was present instead of cadmium. Both these complexes were found to be effective catalysts for the polymerization of alkylene sulphides, and after removal of metal the properties of the polymer were found to be consistent with their having three thiol groups per molecule.

EXAMPLE XII

This example illustrates the preparation of bifunctional initiators containing two metal-sulphur bonds and a donor atom within the organic grouping and which in their simplest form would have the general structure

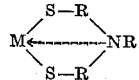

(a) Cadmium mercaptide of N-bis (β-mercapto-ethyl) ethylamine

To a solution of cadmium acetate dihydrate (7.5 gm.) in water (45 ml.) and concentrated ammonia (20 ml.) was added the amino dithiol (4.39 gm.). The mixture was shaken vigorously for 1 hour. The white precipitate was removed and washed thoroughly with distilled water until neutral. It was then washed with methanol and ether and finally dried under high vacuum. The product was insoluble in common solvents, but rapidly dissolved in propylene sulphide-benzene mixtures and effected rapid conversion of the propylene sulphide to polymer.

(b) Zinc and cadmium mercaptides of N-bis (2-mercaptopropyl) benzylamine

These were prepared in a manner similar to that of the preceding experiment. Both were white solids; the zinc catalyst was soluble in solvents and in monomer whereas the cadmium catalyst was essentially insoluble in solvents and in monomer.

EXAMPLE XIII

This example illustrates that polymerizations of propylene sulphide with the types of catalysts used in this invention are not retarded or influenced significantly by the presence of water. Catalyst (0.0048 g. cadmium bis (N-di-butylaminopropane-2-mercaptide) prepared as in Example II unless otherwise stated) was dissolved in 15 cc. of monomer and the mixture stirred end-over-end in a capped beverage bottle at room temperature for 72 hours. The polymer was isolated by diluting with benzene and freeze drying the solution. The experiment was repeated except that 5 cc. of deionised water was also added to the mixture in a crown-capped bottle. The reaction was allowed to proceed under the same conditions as above and the polymer was isolated in the same way. It was observed that the products from the two experiments were identical in molecular weight and yield.

Condition:
  Anhydrous—
    Percent yield _____ 100
    $\eta$-CHCl$_3$ _____ 1.8
  Aqueous—
    Percent yield _____ 100
    $\eta$-CHCl$_3$ _____ 1.8

EXAMPLE XIV

This example illustrates the preparation of zinc and cadmium containing catalysts from ethylene imine-ethylene sulphide reaction products.

Equimolar proportions of ethylene imine and ethylene sulphide were reacted in chloroform solution (as a 20% solution) for 16 hours at 15° C. Solvent was removed, without heating, at 0.1 mm. Hg to give an oil in quantitative yield. The oil slowly polymerized on standing or on attempted distillation. Its properties were consistent with the structure

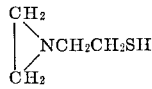

but it is believed that some higher molecular weight self condensation products e.g.

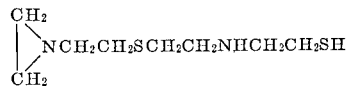

and cyclic structures were also present. The oil (52 g.) was treated with cadmium acetate dihydrate (75 g.) in methanol (200 ml.) and 0.880 ammonia (50 ml.). A mildly exothermic reaction ensued which was completed by heating under reflux for 1 hour. Solvent was removed, the product washed with water and dried under vacuum. The cadmium complex was a solid resinous material which polymerized propylene sulphide in bulk or solution rapidly at room temperature.

Replacing the cadmium acetate by hydrated zinc acetate (56 g.) in the above preparation gave the zinc complex which was also an effective catalyst for the polymerization of propylene sulphide.

EXAMPLE XV

This example illustrates the preparation of catalysts consisting of the zinc or cadmium mercaptide of N,N'-bis-($\beta$-mercaptoethyl)piperazine.

To a solution of cadmium acetate dihydrate (15 gm.), in methanol (100 ml.) was added 0.880 ammonia (15 ml.) and the dithiol (10.0 gm.). After refluxing for 1 hour the precipitate was filtered off, washed thoroughly with water, methanol and ether and dried in vacuo. The analysis of the cadmium complex was C=27.9%; H=4.8%; N=5.9%; S=12.4%; Cd=36.9% O (by difference)=12.1%. This analysis showed that in addition to the formation of the metal mercaptide, i.e.

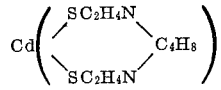

or polymeric structures of the same empirical formula, additional cadmium acetate was complexed to the nitrogen atoms.

Similar results were obtained using hydrated zinc acetate (11.5 gm.) instead of the cadmium acetate.

EXAMPLE XVI

This example illustrates the preparation of a cadium containing catalyst from a 2-oxo thiol.

To a solution of cadmium acetate dihydrate (14 gm.) in boiling methanol (100 ml.) and 0.880 ammonia (10 ml.) was added 2-(butyloxy) ethyl mercaptan (13.8 gm.). The white precipitate which formed, redissolved almost immediately. After 30 minutes most of the alcohol was removed under reduced pressure, and the residue was poured into water. The oily layer was extracted with benzene, washed thoroughly with water, and dried with anhydrous magnesium sulphate. The solvent was removed by freeze-drying to leave a resinous solid (93%) having a molecular weight in benzene of about 4770 and in chloroform of about 3820. This shows that in these solvents co-ordination of the oxygen with carmium is largely intermolecular, differing in this respect from the amino complexes such as those described in Example I.

Analysis.—Found (percent): C, 36.6; H, 6.6; S, 15.3; Cd, 30.9. Calc. (percent): C, 38.0; H, 6.9; S, 16.9; Cd, 29.7.

(The analytical discrepancies are probably due to traces of cadmium acetate remaining in the product.) This compound was an excellent catalyst, showing no induction period, for the polymerization of episulphides.

The following Examples XVII and XVIII illustrate the preparation of catalysts in which the co-ordinating atom is sulphur, present as the thioether linkage.

EXAMPLE XVII 2-mercaptoethyl dodecyl sulphide (10.5 gm.) was reacted with Cd(OAc)$_2$·2H$_2$O (7 gm.) in methanol (50 ml.) and 0.880 ammonia (18 ml.). The product was isolated as in Example XVI; molecular weight in benzene=3240, chloroform=1050. It proved to be an excellent catalyst for the polymerization of episulphides.

Found (percent): C, 52.9; H, 9.3; S, 18.7; Cd, 17.9. Calc. (percent): C, 52.9; H, 9.2; S, 20.0; Cd, 17.7.

EXAMPLE XVIII

Cd(OAc)$_2$·2H$_2$O (13.3 gm.) in methanol (100 ml.) and 0.880 ammonia (20 ml.) was reacted with 2-mercaptoethyl butyl sulphide (15 gm.) in an identical manner to Example XVI. The product was a highly viscous gum which was soluble in benzene, but only slightly so in petrol and ether. M.wt. 5930 (benzene), 2960 (chloroform).

Found (percent): C, 34.6; H, 6.3; S, 29.5; Cd, 28.6. Calc. (percent): C, 35.1; H, 6.3; S, 31.2; Cd, 29.3.

This complex was found to be an excellent catalyst for the preparation of polymers from episulphides.

In both these examples the molecular weight of the complexes in solution were greatly in excess of that of the monomeric compound, showing that (as in the case where oxygen is the co-ordinating atom as in Example VXI) associated is predominantly intermolecular rather than intramolecular.

Having now described our invention; what we claim is:

1. A metal mercaptide suitable for use as a catalyst for the polymerization of episulphides, said mercaptide being the reaction product of a reactive compound of a metal selected from zinc, cadmium, silver, copper, nickel and lead and a compound selected from the group consisting of N-dibutylaminopropane-2-thiol and N-monobutylaminopropane-2-thiol.

2. A metal mercaptide suitable for use as a catalyst for the polymerization of episulphides, said mercaptide being the reaction product of a reactive compound of a metal selected from zinc, cadmium, silver, copper, nickel and lead and N-bis (beta-mercaptoethyl) ethylamine.

3. A metal mercaptide suitable for use as a catalyst for the polymerization of episulphides, said mercaptide being the reaction product of a reactive compound of a metal selected from zinc, cadmium, silver, copper, nickel and lead and N-bis (2-mercaptopropyl) benzylamine.

4. A metal mercaptide suitable for use as a catalyst for the polymerization of episulphides, said mercaptide being the reaction product of a reactive compound of a metal selected from zinc, cadmium, silver, copper, nickel and lead and a substituted organic amine having a reactive thiol group and having the formula $$R_5(R_4)N-R_1-SH$$

wherein $R_1$ is $-CH_2.CH_2-$ or $$-CH_2.CH_2S.CH_2.CH_2.NH.CH_2.CH_2-$$

and $R_5$ and $R_4$ jointly form a group selected from $$-CH_2.CH_2-$$

and $-CH_2.CH_2.N(CH_2.CH_2.SH).CH_2.CH_2-$.

References Cited

UNITED STATES PATENTS

| | | | |
|---|---|---|---|
| 2,038,486 | 4/1936 | Glas | 204—1 |
| 2,855,418 | 10/1958 | Mugnier | 260—429 |
| 2,976,122 | 3/1961 | Ertelt et al. | 23—230 |
| 3,027,239 | 3/1962 | Clark | 23—230 |

FOREIGN PATENTS 1,211,626  3/1966  Germany.

OTHER REFERENCES

Epstein et al., Inorg. Chem., 4 (1965) pp. 1551–2.
Leussing et al., J. Am. Chem. (Soc. 82 (1960) pp. 4858–9.
Neville et al., J. Am. Chem. Soc., 78 (1965) p. 4895.
Vasil'eva et al., Chem. Abst., 54 (1960) col. 24370.
Schwarzenbach, Chem. Abst., 63 (1965) col. 5673.
Hein et al., Z. Anorg. Allgem. Chemie, 308 (1961) pp. 133–9.
Tanaka et al., Chem. Pharm. Bull (Tokyo) 10 (1962) pp. 18, 23, 30.

TOBIAS E. LEVOW, Primary Examiner

A. P. DEMERS, Assistant Examiner

U.S. Cl. X.R.

252—431; 260—79.7, 242, 268, 429, 429.9, 438.1, 430, 435, 439, 570.9, 583, 607